United States Patent [19]

Kaiguchi et al.

[11] Patent Number: 4,974,873
[45] Date of Patent: Dec. 4, 1990

[54] MALFUNCTION PREVENTING DEVICE FOR AIR BAG MODULE IN AUTOMOBILES

[75] Inventors: Muneaki Kaiguchi; Hisakazu Okuhara; Tadahide Miyazawa; Junichi Fukuda; Koichi Kamiji, all of Utsunomiya, Japan

[73] Assignee: Honda Giken Kogyo Kabushiki Kaisha, Tokyo, Japan

[21] Appl. No.: 463,201

[22] Filed: Jan. 10, 1990

Related U.S. Application Data

[62] Division of Ser. No. 160,050, Feb. 24, 1988, abandoned.

[30] Foreign Application Priority Data

| Feb. 26, 1987 | [JP] | Japan | 62-43950 |
| Feb. 26, 1987 | [JP] | Japan | 62-43951 |
| Feb. 26, 1987 | [JP] | Japan | 62-43952 |
| Mar. 9, 1987 | [JP] | Japan | 62-53508 |

[51] Int. Cl.⁵ .............................. B60R 21/32
[52] U.S. Cl. ....................... 280/735; 200/61.58 R
[58] Field of Search .............. 280/735, 734, 731, 732, 280/730, 728, 741, 736; 200/61.62, 61.58 R; 439/507, 511

[56] References Cited

U.S. PATENT DOCUMENTS

| 3,742,858 | 7/1973 | Stonestrom | 280/735 |
| 3,848,695 | 11/1974 | Lacaze, Jr. | 280/735 |
| 3,916,376 | 10/1975 | Tuttle | 280/735 |
| 4,158,191 | 6/1979 | Rogers et al. | 280/735 |
| 4,167,276 | 9/1979 | Bell et al. | 280/731 |
| 4,195,897 | 4/1980 | Plevjak | 439/507 |
| 4,359,715 | 11/1982 | Langer et al. | 280/735 |

FOREIGN PATENT DOCUMENTS

| 2511459 | 9/1976 | Fed. Rep. of Germany | 439/511 |
| 3619937 | 12/1987 | Fed. Rep. of Germany | 280/734 |

*Primary Examiner*—Charles A. Marmor
*Assistant Examiner*—Karin Tyson
*Attorney, Agent, or Firm*—Armstrong, Nikadio, Marmelstein, Kubovcik & Murray

[57] ABSTRACT

In an air bag module mounted on a steering wheel in an automobile for use, an inflater is connected to a power source through an actuating circuit to rapidly supply a high pressure gas into an air bag of the module when a dceleration of a vehicle body higher than a predetermined value is sensed, and interrupting means is provided for the purpose of preventing the malfunction of the module. The interrupting means automatically interrupts the actuating circuit in concurrence with removal of the air bag module from the steering wheel.

6 Claims, 11 Drawing Sheets

MALFUNCTION PREVENTING DEVICE FOR AIR BAG MODULE IN AUTOMOBILES

This is a division of application Ser. No. 160,050 filed Feb. 24, 1988, now abandoned.

BACKGROUND OF THE INVENTION

1. Field of the Invention

The present invention relates to a malfunction preventing device for an air bag module in automobiles, in which upon occurrence of a crash accident of an automobile, an air bag is rapidly inflated to prevent a driver from colliding against a steering wheel, a front glass or the like.

2. DESCRIPTION OF THE PRIOR ART

In automobiles having an air bag module detachably mounted on a steering wheel, which module comprises an air bag, an inflater adapted to rapidly supply a high pressure gas into the air bag, and a deceleration sensing mechanism for operating the inflater when a deceleration of a vehicle body has been increased to a level higher than a given value, there is conventionally known an apparatus wherein in order to prevent the malfunction of the module when separated from the steering wheel, a locking mechanism adapted for engagement with the deceleration sensing mechanism to maintain the latter inoperative is operated in the condition that the air bag module has been detached, as described, for example, in Japanese Patent Application Laid-open No. 78536/78.

In the above prior art apparatus, the exclusive locking mechanism operable with removal or detachment of the module should be specially added to the deceleration sensing mechanism having a complicated structure from requirement for a high accuracy. This results in the over-all arrangement being complicated and in an increased cost. Additionally, there is also a fear of reduction in operational precision for the deceleration sensing mechanism.

SUMMARY OF THE INVENTION

The present invention has been accomplished with the foregoing in view, and it is an object of the present invention to provide a malfunction preventing device for an air bag module, which is simple in structure and in which the problems associated with the prior art apparatus can be overcome.

To attain the above object, according to the present invention, there is provided a malfunction preventing device for an air bag module, in which an actuating circuit for actuating the inflater by a power supplied from a power source can be interrupted by interrupting means.

Further, according to the present invention, there is provided a malfunction preventing device for an air bag module, comprising interrupting means for automatically interrupting the actuating circuit in concurrence with removal of the air bag module from a steering wheel.

With the above construction, in removing the unused air bag module from the steering wheel, the interruption of the actuating circuit by the interrupting means eliminates a possibility for the inflater to malfunction even if a deceleration sensing switch is accidentally operated due to a shock or the like. Moreover, it is unnecessary to apply a special artifice and adaptation to the deceleration sensing switch required for a high accuracy and having a complex structure and therefore, it is possible to provide a malfunction preventing device simple in over-all structure, and the deceleration sensing switch does not suffer from reduction in its operational precision.

Furthermore, because the actuating circuit is interrupted by the interrupting means when the air bag module has been removed from the steering wheel, procedures of removal and attachment of the air bag module are simplified and further, the module can be handled while reliably preventing the malfunction or accidental operation of the inflater. Therefore, the malfunction preventing device of the present invention makes it possible to provide an air bag module which can be handled extremely easily.

In addition to the above construction, if a power source for operating the inflater is comprised of a primary power supply and an auxiliary power supply, the inflater can be reliably operated by the auxiliary power supply even if no power is supplied from the primary power supply.

The above and other objects, features and advantages of the invention will become apparent from reading of the following description of the preferred embodiments, taken in conjunction with the accompanying drawings.

BRIEF DESCRIPTION OF THE DRAWINGS

Drawings illustrate several embodiments of the present invention.

DESCRIPTION OF THE PREFERRED EMBODIMENTS

The preferred embodiments of the present invention will not be described with reference to the accompanying drawings. Like parts are designated by like reference characters throughout these embodiments.

Figure 1:
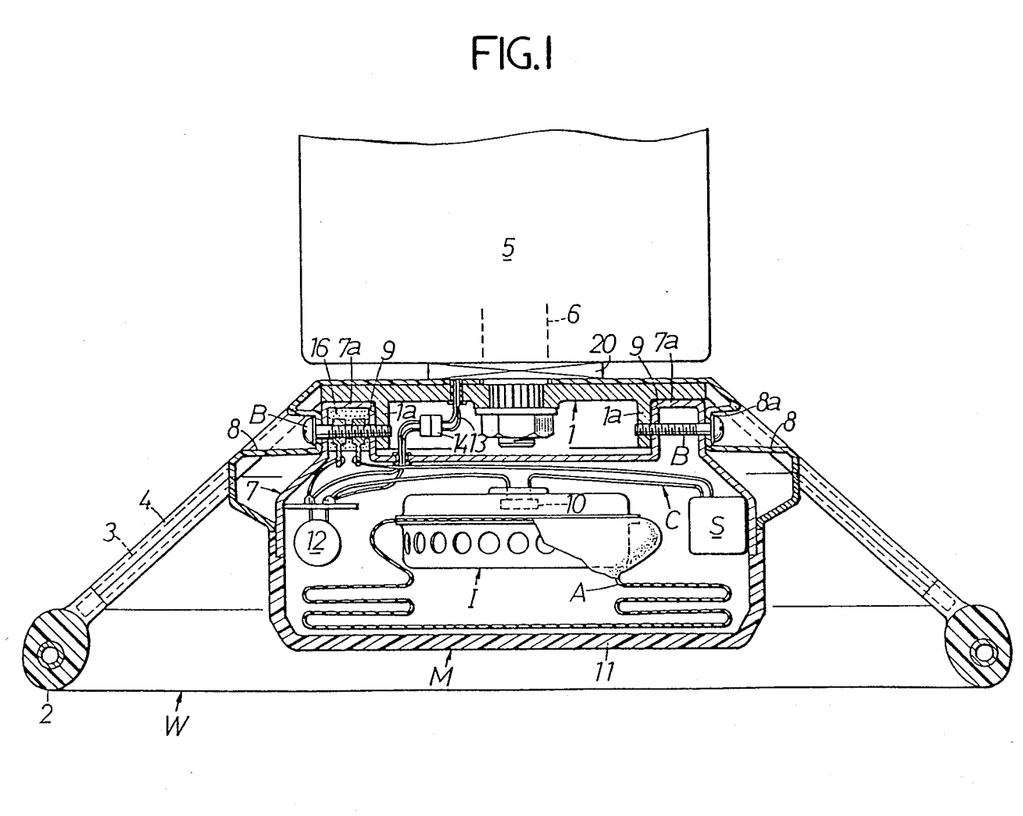
FIGS. 1 to 3 illustrate a first embodiment, FIG. 1 being a general view in longitudinal section of a steering wheel portion having an air bag module mounted thereon, FIG. 2 being an enlarged sectional view of details shown in FIG. 1, and FIG. 3 being a circuit diagram.
Figure 2:
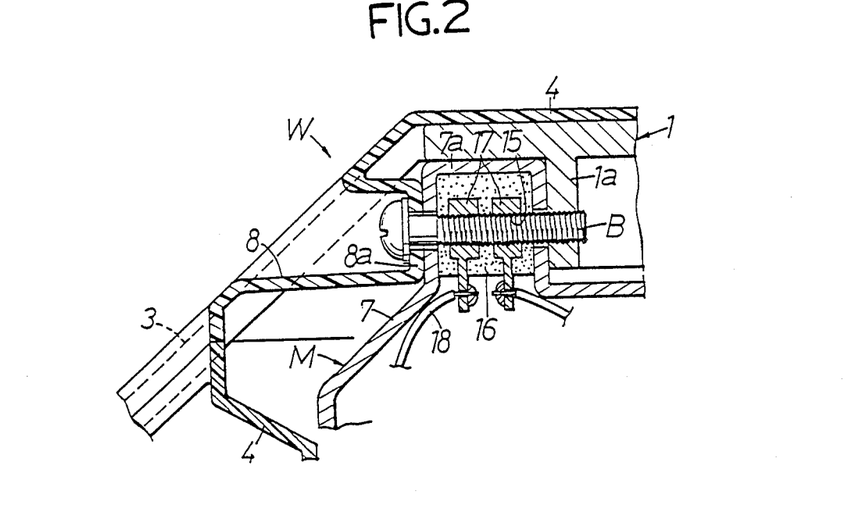
Figure 3:
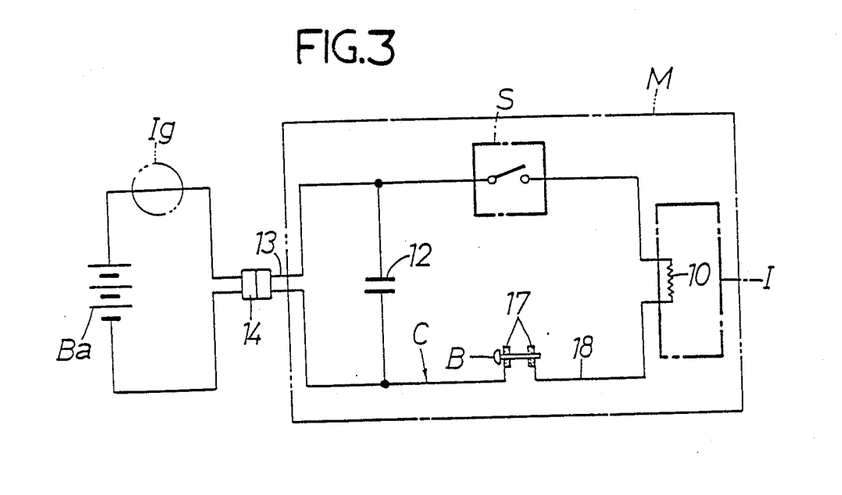

FIGS. 1 to 3 illustrate a first embodiment of the present invention.

Referring first to FIGS. 1 and 2, a steering wheel W for an automobile comprises a central boss plate 1, an annular wheel rim 2 which is a grip, respective two left and right spokes 3 radially extending from left and right opposite sides of the boss plate 1 with two spokes on each side being circumferentially spaced apart from each other to integrally interconnect the wheel rim 2 and the boss plate 1, and a wheel cover 4 split into front and rear parts and secured to the spokes 3 and the boss plate 1 to cover them. The boss plate 1 is connected to a rear end of a steering shaft 6 which rotatably carries a steering column 5.

A bowl-like module case 7 for an air bag module M is attached to a rear surface of the boss plate 1 in the following manner. A pair of support walls 1a are provided in projection on the rear surface of the boss plate 1 and opposed to each other through the steering shaft 6, so that each of outer surfaces of the support walls 1a is opposed, at a given gap 9, to respective one of bottom walls 8a of a pair of recesses 8 provided on the wheel cover 4. Each of a pair of legs 7a provided on the bottom of the module case 7 to project therefrom is inserted into respective one of the gaps 9, and the modular case 7 is secured to the boss plate 1 by bolts B which serve as a connector and each of which is passed through the bottom wall 8a and the leg 7a and threadedly inserted into the support wall 1a.

The air bag module M comprises an air bag A, an inflater I for rapidly supplying a high-pressure gas into the air bag A, an ignitor 10 for firing a detonator (not shown) of the inflater I to activate the latter, an actuating circuit C for energizing the ignitor 10 to actuate the latter, and a deceleration sensing switch S which normally opens the actuating circuit C and closes the latter only when a deceleration larger than a given value acts on a vehicle body. Except the air bag A, these elements are contained and fixed inside the module case 7. A bowl-like module cover 11 is attached to a rear opening edge of the modular case 7, and a leading portion of the air bag A secured at its base portion to an outer periphery of the inflater I is contained in a folded manner in a space enclosed by the modular cover 11.

Further, a power source 12 exclusively used for the module is connected to the actuating circuit C, and the deceleration sensing switch S and the ignitor 10 for inflater I are incorporated in series in the actuating circuit C, as shown in FIG. 3. In this embodiment, the power source 12 comprises a capacitor connected through a connecting cord 13 to a battery Ba carried on the vehicle, as shown in FIG. 3. A coupler 14 is connected to the connecting cord 13 in a manner to enable the separation between a portion of the cord 13 for the steering wheel W and a portion of the cord 13 for the air bag module M. Additionally, an ignition switch for an engine may be incorporated on the portion of the cord 13 for the steering wheel W at a place indicated by Ig in FIG. 3.

Figure 4:
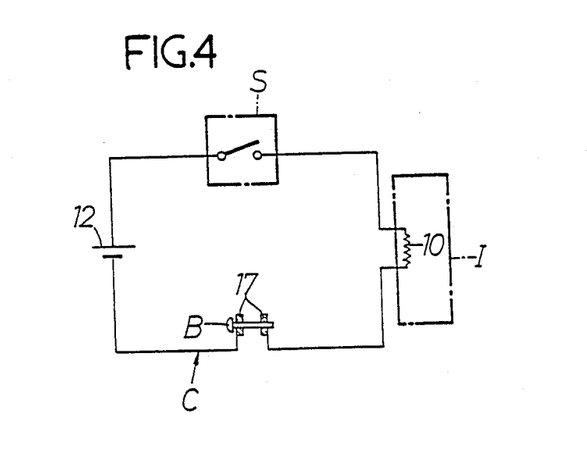
FIG. 4 is a circuit diagram of a modification of the first embodiment.
Figure 5:
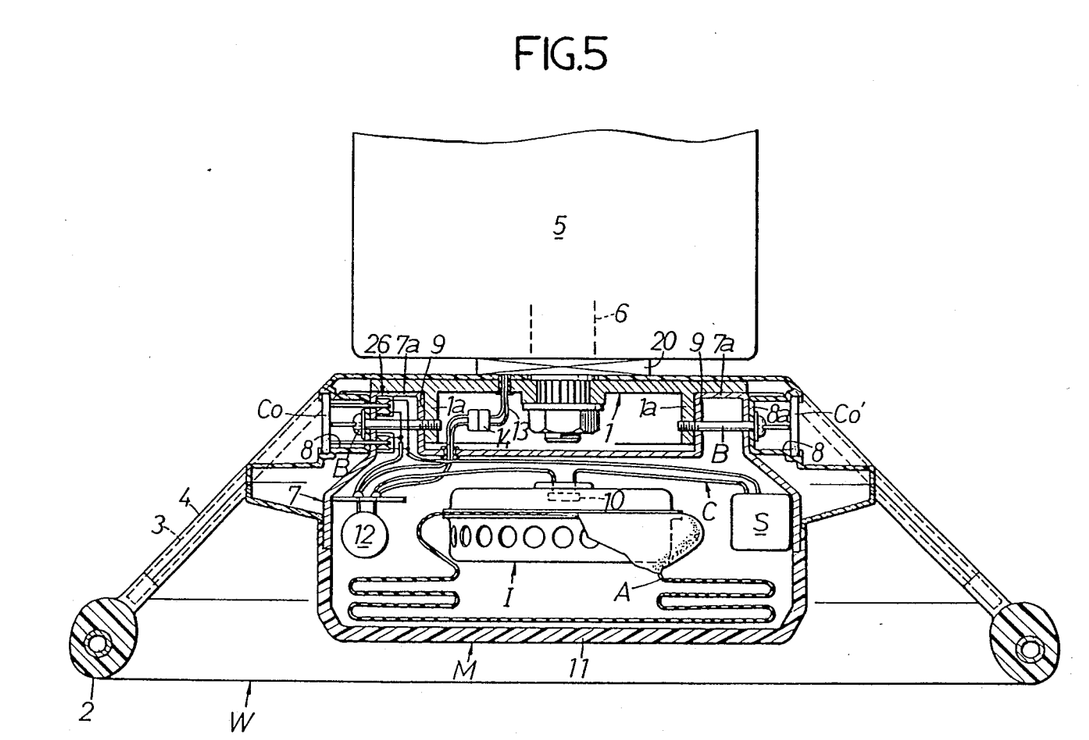
FIGS. 5 to 8 illustrate a second embodiment, FIG. 5 being a general view similar to FIG. 1, FIG. 6 being an enlarged sectional view of details shown in FIG. 5, FIG. 7 being a perspective view of a cover member, and FIG. 8 being a circuit diagram.

It is to be noted that in place of the capacitor shown in FIG. 3, an exclusive battery separate from the battery carried on the vehicle may be used as in an modification shown in FIG. 4.

A device for preventing a malfunction of the air bag module M in a condition of the module removed from the steering wheel W is mounted in the air bag module M in the following manner. As clearly shown in FIG. 2, an electric insulating material 16 having a pair of terminals 17 fixedly buried therein in parallel at a distance spaced apart from each other is secured within one of the legs 7a on the bottom surface of the module case 7. A threaded hole 15, in which one bolt B serving as interrupting means of the present invention is screwed, is made through the terminals 17 and the insulating material 16. A pair of ends, of a lead wire 18 of the actuating circuit C, provided by cutting the middle of the lead wire 18, are connected to the terminals 17, respectively. Thus, the bolt B is incorporated on the way of the actuating circuit C as the interrupting means for electrically connecting both the terminals 17 to each other when it has been passed through the leg 7a of the module case 7 as shown in FIG. 2 and for interrupting the terminals 17 from each other when it has been separated from the legs 7a.

In FIG. 1, the reference numeral 20 denotes a known slip ring for interconnecting the steering wheel-side portion of the cord 13 and a steering further column-side portion of the cord 13 for relative rotation.

Description will be made of the operation of the above embodiment. The air bag module M is mounted to the steering wheel W such that the pair of legs 7a of the module case 7 are secured to the pair of support walls 1a of the boss plate 1 through the bolts B. In this state, the terminals 17 are in electrical connection to each other through the single bolt B. In a normal operation of the automobile, the deceleration sensing switch S cannot be operated and is maintained open, because a deceleration acting on the vehicle body is less than a given value. Therefore, the actuating circuit C is held in the open state only by the deceleration sensing switch S. Accordingly, when a deceleration larger than the given value acts on the vehicle body, the deceleration sensing switch S is operated immediately to close the actuating circuit C, thereby energizing the ignitor 10 of the inflater I, so that the ignitor 10 fires the detonator (not shown) to actuate the inflater I. This causes a high pressure gas to be rapidly supplied into the air bag A by the inflater I, so that the air bag A rapidly inflates to break through the cover 11 and largely stand in front of a driver. This enables the driver to be prevented from colliding against the steering wheel W and a front glass (not shown).

To detach the unoperated air bag module M from the steering wheel W, the individual bolts B may be loosened and withdrawn from the legs 7a of the module case 7. Then, the module case 7 is manually pulled rearwardly along the axis, of the steering wheel W, while separating the coupler 14 for the connecting cord 13. In this state, the terminals 17 has been automatically interrupted their connection by removal of the bolt B serving as the interrupting means and hence, the actuating circuit C is placed in the open even at the terminals 17. Consequently, state also if the deceleration sensing switch should be operated into a closed state due to a trouble or another cause, the actuating circuit C cannot be closed. This ensures that the malfunction of the inflater I and thus the air bag A can be reliably prevented.

FIGS. 5 to 8 illustrate a second embodiment of the present invention. This embodiment has an arrangement substantially similar to that of the first embodiment, except that interrupting means of the actuating circuit is different from that of the first embodiment.

More specifically, in this embodiment, a pair of cover members Co and Co' are detachably mounted so as to close openings of the recesses 8 respectively for covering heads of bolts B which integrally secure the boss plate 1 and the modular case 7 together. One of the cover members Co is also used as interrupting means of the actuating circuit C.

Figure 6:
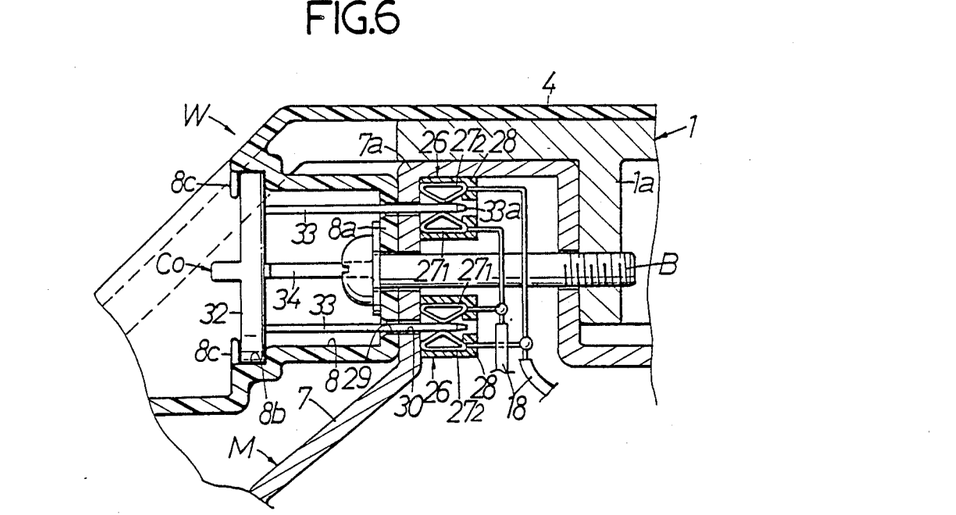
Figure 7:
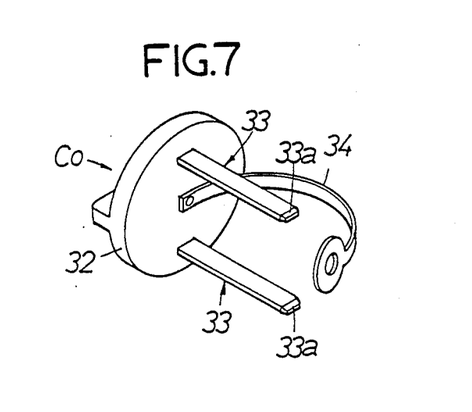

As clearly shown in FIG. 6, a pair of terminal units 26 are fixedly mounted on the inner surface of outer wall of the left leg 7a projecting from the bottom surface of the modular case 7, and are arranged side by side with the bolt B sandwiched therebetween. Each of the terminal units 26 comprises first and second terminals $27_1$ and $27_2$ and an electrically insulating material 28 attached to the terminals $27_1$ and $27_2$ so as to provide a given gap between the terminals. Through holes 29 and 30 are made in the wheel cover 4 and the leg 7a respectively in correspondence with the gap between the terminals $27_1$ and $27_2$. One of a pair of ends of a lead wire 18 of the actuating circuit C, provided by cutting the middle of the lead wire 18, is connected to the first terminal $27_1$ of each of the terminal units 26, while the other end of the lead wire 18 is connected to the second terminal 27 of each terminal unit 26. The left cover member Co for closing the left recess 8 of the wheel cover 4 is comprised of a cover body 32 seated on an annular shoulder or stepped portion 8b provided at an open edge of the recess 8, and a pair of insert pieces 33 of a conductive material integrally provided on and projecting from the back surface of the body 32. The leading end 33a of each of the insert pieces 33 is removably inserted between the first and second terminals $27_1$ and $27_2$ of each terminal unit 26 to electrically connect the terminals $27_1$ and $27_2$ to each other. A base portion of a flexible connecting member 34 rotatably connected at its fore portion to the head of the bolt B is integrally attached to the cover body 32. A plurality of resilient locking claws 8c having a flexibility are provided on the open edge of the recess 8 of the wheel cover 4 at circumferential distances, so that engagement of the claws 8c with an outer periphery of the cover body 32 prevents the separation of the cover body 32 from the wheel cover 4. The cover member Co including the insert pieces 33 is thus incorporated on the way of the actuating circuit C as the interrupting means for electrically connecting the first and second terminals $27_1$ and $27_2$ to each other in the state in which it has been attached to the wheel cover 4 as shown in FIG. 6 and for interrupting the terminals $27_1$ and $27_2$ from each other in the state in which it has been separated from the wheel cover 4.

The right cover member Co' has a structure substantially similar to that of the left cover member Co, except that it has no insert pieces and hence, does not have a function as interrupting means. The manner of mounting the right cover member Co' to the wheel cover 4 is also similar to that for the left cover member Co.

Thus, in the second embodiment, the actuating circuit C is electrically connected by the leading ends 33a of the insert pieces 33 of the cover member Co being inserted between the first and second terminals $27_1$ and $27_2$ and therefore, if the deceleration sensing switch S senses a deceleration of a vehicle body larger than a given value, the ignitor 10 causes the inflater I to be operated to enable a rapid inflation of the air bag A.

Meanwhile, in removing the unoperated air bag module M from the steering wheel W, the cover members Co and Co' have to be separated from the wheel cover 4 when the individual bolts B. Therefore, the actuating circuit C is opened between the terminals $27_1$ and $27_2$ to ensure that the malfunction of the air bag A can be reliably prevented.

Figure 9:
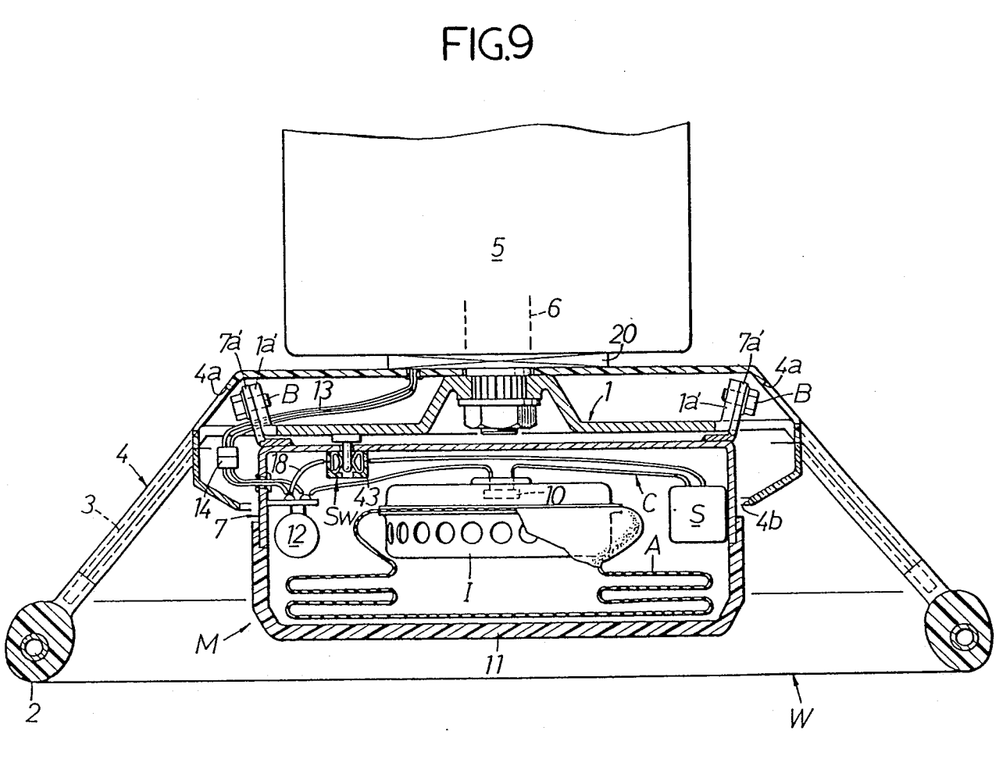
FIGS. 9 to 11 illustrate a third embodiment, FIG. 9 being a general view similar to FIG. 1, FIG. !0 being an enlarged sectional view of details shown in FIG. 9, and FIG. 11 being a circuit diagram.
Figure 10:
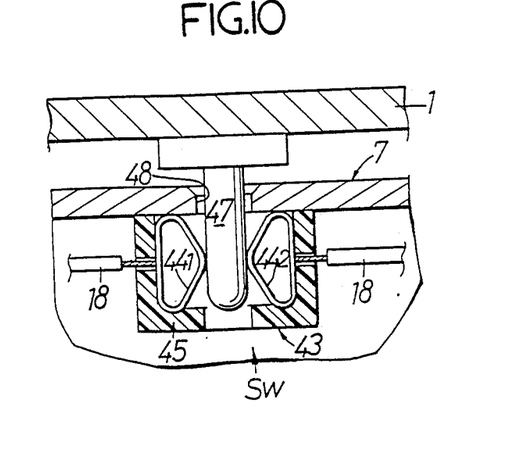
Figure 11:
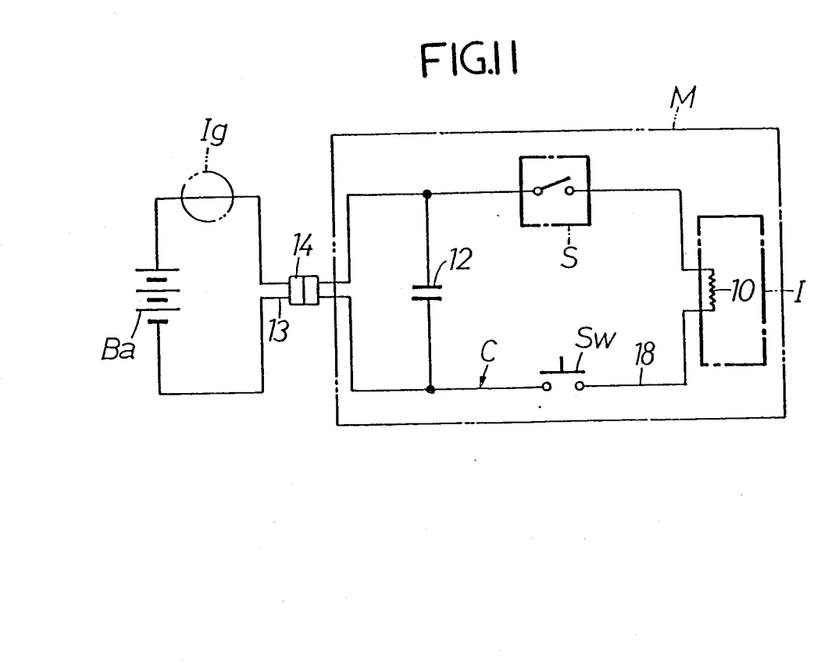

FIGS. 9 to 11 illustrate a third embodiment of the present invention. This embodiment has an arrangement substantially similar to that of the first embodiment, except that interrupting means of the actuating circuit and the connection structure between the steering wheel and the air bag module are different from those of the first embodiment.

In this embodiment, laterally opposite ends of the boss plate I are bent toward the steering column 5 to form brackets 1a' against which a pair of left and right brackets 7a' fixedly mounted on the bottom surface of the module case 7 abut and into which bolts B penetrating the brackets 7a' are threadedly inserted, so that the brackets 7a' are secured to the boss plate 1 through the corresponding bolts B, respectively. The wheel cover 4 is perforated with a pair of through holes 4a for insertion of a tool (not shown) for tightening the bolts B and further has an opening made therein and surrounding the outer periphery of the module case 7 with a small gap left therebetween.

A terminal unit 43 is fixedly mounted on an inner surface of a bottom wall of the module case 7. As shown in an enlarged scale in FIG. 10, the terminal unit 43 comprises first and second resiliently deformable terminals $44_1$ and $44_2$ an electrically insulating material 45 attached to the terminals $44_1$ and $44_2$ to provide a given gap between the terminals. A through hole 48 is made in the bottom wall of the module case 7 to correspond with the gap between the terminals $44_1$ and $44_2$. A pair of ends, of a lead wire 18 of the actuatIng circuit C, provided by cutting the middle of the lead wire, are connected to the first and second terminals $44_1$ and $44_2$, respectively. An insert pin 47 of a conductive material is integrally provided on and projects from the back surface of the boss plate 1 for removable insertion between the first and second terminals $44_1$ and $44_2$ via the through hole 48. The insert pin 47 and the terminal unit 43 form an on/off switch Sw serving as interrupting means of the present invention which is adapted to close the actuating circuit C when the modular case 7 has been joined to the boss plate 1 of the steering wheel W as shown in FIGS. 9 and 10 and to open the actuating circuit C when the modular case 7 has been separated from the boss plate 1.

Figure 12:
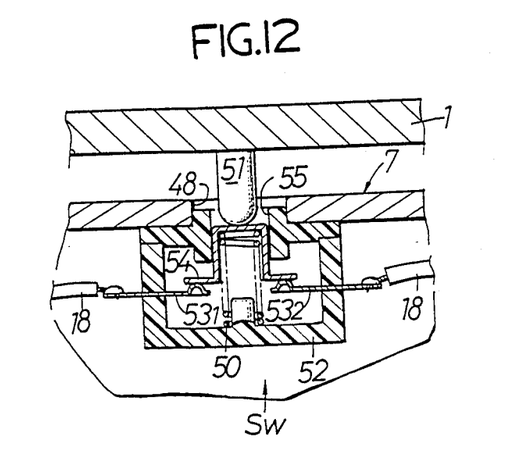
FIG. 12 is a sectional view of a modification of the third embodiment, similar to FIG. 10.

In FIG. 12, there is shown a modification of an on/off switch Sw mounted between the module case 7 and the boss plate 1. This on/off switch Sw comprises a box 52 of an electrically insulting material secured to the inner surface of the bottom wall of the modular case 7, first and second resiliently deformable plate-like terminals $53_1$ and $53_2$ secured to left and right opposite side walls of the box 52 and each having a free end extending into the box 52, a movable tubular contact 54 slidably received in a guide hole 55 in a front wall of the box 52 for contact with and separation from both the terminals $53_1$ and $53_2$, a spring 50 for biasing the movable contact 54 away from the terminals $53_1$ and $53_2$, and an insert pin 51 for permitting the movable contact 54 to bear on the terminals $53_1$ and $53_2$ against a biasing force of the spring 50 in a normal condition, i.e., when the modular case 7 has been attached to the boss plate 1.

In this modification, if the module case 7 is separated from the boss plate 1, the movable contact 54 is released from the insert pin 51 and moved away from the terminals $53_1$ and $53_2$ by the biasing force of the spring 50, so that the actuating circuit is brought into a normally opened state by the on/off switch Sw. This ensures that the malfunction of the inflater I can be reliably prevented.

Figure 8:
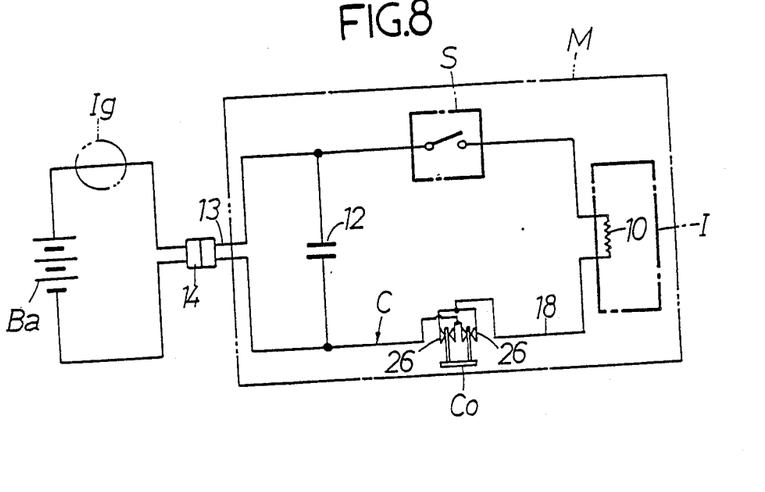

It will be understood that in the above second and third embodiments, a separate exclusive battery can be used as a power supply for the individual actuating circuit C in place of the capacitor 12 shown in FIGS. 8 and 11, as in the modification of the first embodiment shown in FIG. 4.

Figure 13:
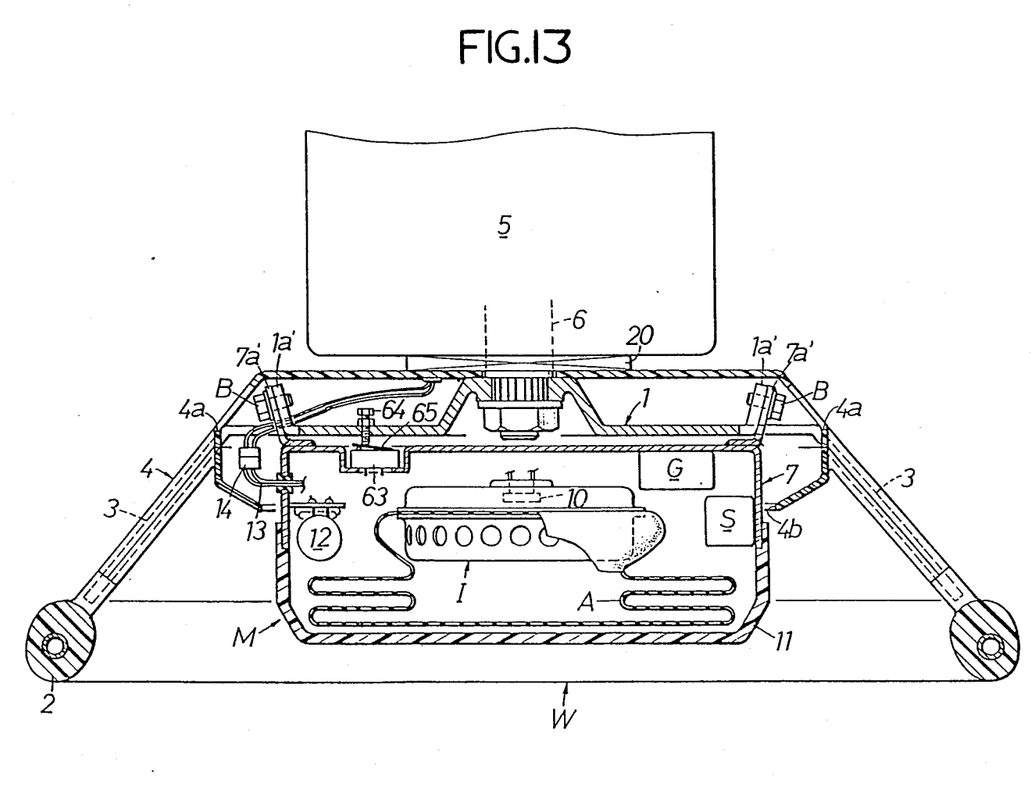
FIGS. 13 and 14 illustrate a fourth embodiment, FIG. 13 being a general view similar to FIG. 1, and FIG. 14 being a circuit diagram.
Figure 14:
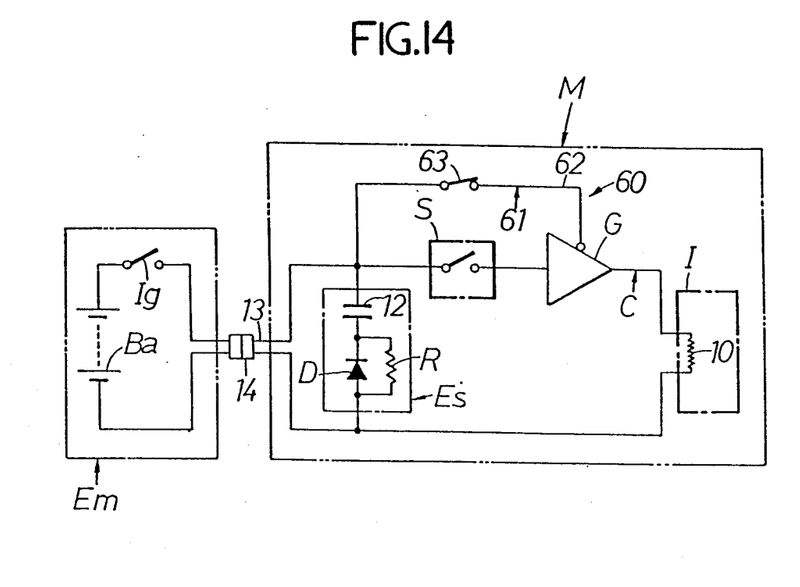

FIGS. 13 and 14 illustrate a fourth embodiment in which an arrangement of air bag module M attached to the steering wheel W is similar to that in the third embodiment. However, the fourth embodiment is different from the above three embodiments in respect of constructions of an actuating circuit and a power supply therefor.

More specifically, a deceleration sensing switch S is incorporated in an actuating circuit C capable of actuating the ignitor 10 of the inflater 1, and a primary power supply Em and an auxiliary power supply Es are connected to each other in parallel. The inflater I, the actuating circuit C, the deceleration sensing switch S and the auxiliary power supply Es are contained and held inside the module case 7.

The primary power supply Em is comprised of a vehicle-carried battery Ba and an ignition switch Ig for an engine (not shown), these elements being incorporated in series. Alternatively, the switch Ig may be omitted from the primary power supply Em. The auxiliary power supply Es is comprised of a capacitor 12, a resistor R across which a current flows during charging into the capacitor 12, and a diode D across which a current flows during discharging from the capacitor 12. The resistor R and the diode D are arranged in parallel to each other.

Interrupting means of the actuating circuit C in the present embodiment is comprised of a drive gate G incorporated in the actuating circuit C between the deceleration sensing switch S and the ignitor 10 of the inflater, the gate being closed in an inoperative condition, and a controller 61 capable of applying a signal voltage to the gate G from the auxiliary power supply Es. The drive gate G is designed to become opened only when the signal voltage is higher than a predetermined level, i.e., a voltage level which enables the actuating circuit C to effectively function. The controller 61 comprises a signal circuit 62 connecting the auxiliary power supply Es and a signal input of the drive gate G, and a detachment sensing switch 63 incorporated in the circuit 62 and adapted to be open when the module M is in the state in which it has been attached to the steering wheel W and to become closed when it has been detached from the steering wheel W. An example of the switch 63 which may be used is a normally-closed microswitch attached to the bottom wall of the module case 7 and having a switching element 65 adapted to bear against an adjusting screw 64 in the boss plate 1 in the condition in which the module M has been attached.

The operation of this embodiment will be described below. When the air bag module M is in a state attached to the steering wheel W, the brackets 7a' on the bottom surface of the modular case 7 are secured to the brackets 1a' of the boss plate 1 through the bolts B, and the detachment sensing switch 63 is maintained open by engagement of the switching element 65 with the adjusting screw 64 on the boss plate 1, so that no signal voltage is applied to the drive gate G from each of the power supplies Em and Es and hence, the gate G is closed to connect between the deceleration sensing switch S and the ignitor 10. In a normal operation of the automobile, a deceleration on the vehicle body is less than the given value, so that the deceleration sensing switch S is maintained open without operation. Consequently, the actuating circuit C is in the state in which it has been opened only by the deceleration sensing switch S.

Thus, if the automobile has been involved in an accident under such condition, and a deceleration larger than the given value has acted on the vehicle body, then the deceleration sensing switch S is immediately operated to close the actuating circuit C, thereby energizing the ignitor 10 of the inflater I from the primary power supply Em, so that the ignitor 10 fires an ignited element in the inflater I. This causes the high pressure gas to be rapidly supplied from the inflater I into the air bag A, so that the air bag A rapidly inflates to break through the module cover 11 and stand largely in front of the driver, thereby preventing the driver from colliding against the steering wheel W, a front glass (no shown) or the like. In addition, in such crash accident, even if the energization of the actuating circuit from the primary power supply is failed due to breaking of a wire or the like, a power is supplied from the auxiliary power supply Es to the actuating circuit C, without an obstacle to the operation of the inflater I.

When the unoperated air bag module M is removed from the steering wheel W, the detachment sensing switch 63 is automatically closed, so that a signal voltage is applied to the drive gate from the auxiliary power supply Es. The magnitude of that signal voltage is initially higher than a level at which the actuating circuit C is able to function and hence, the gate G is maintained open. As a result, even if the deceleration sensing switch S should be operated to become closed due to a shock or the like, the actuating circuit C cannot be closed. This ensures that the malfunction of the inflater I can be reliably prevented. In addition, if an amount of current discharged from the capacitor 12 is increased in response to the application of the signal voltage to the drive gate G from the auxiliary power supply Es as described above, the electric potential at the capacitor 12 drops down to a predetermined level, i.e., lower than the level at which the actuating circuit C is able to function, the drive gate G is returned to its closed state. Thereafter, even if the deceleration sensing switch S should be erroneously closed, there is no fear of malfunction of the inflater I, because the electric potential at the auxiliary power supply Es has been decreased to a level lower than the level at which the actuating circuit C is able to function.

What is claimed is:

1. A malfunction preventing air bag module in an automobile having the air bag module detachably mounted on a steering wheel, said air bag module comprising:
    an air bag;
    an inflater for rapidly supplying a bag-inflating high pressure gas into said bag;
    an actuating circuit for actuating said inflater by a power supplied from a power source;
    a deceleration sensing switch adapted to normally open said actuating circuit and to close the latter when a deceleration of a vehicle body exceeds a predetermined value; and
    an interrupting means for interrupting said actuating circuit, wherein said interrupting means also serves as a cover member for covering a connecting member for mounting said air bag module on said steering wheel.

2. The malfunction preventing air bag module of claim 1, wherein said actuating circuit comprises a lead wire including a pair of ends cut away from each other, and said cover member is integrally provided with a conductive member inserted between the pair of ends of said lead wire to electrically connect said ends to each other when said cover member is in service.

3. The malfunction preventing air bag module of claim 3, wherein said power source is a capacitor which is connected to a battery carried on a vehicle and which is incorporated in said actuating circuit.

4. A malfunction preventing air bag module in an automobile in which the air bag module is detachably mounted on a steering wheel, said air bag module comprising:
- an air bag;
- an inflater for rapidly supplying a bag-inflating high pressure gas into said bag;
- an actuating circuit for actuating said inflater by a power supplied from a power source;
- a deceleration sensing switch adapted to normally open said actuating circuit and to close the latter when a deceleration of a vehicle body exceeds a predetermined value; and
- an interrupting means for automatically interrupting said actuating circuit in concurrence with removal of said air bag module from said steering wheel, wherein said interrupting means also serves as a cover member for covering a connecting member for mounting said air bag module on said steering wheel.

5. The malfunction preventing air bag module of claim 4, wherein said actuating circuit comprises a lead wire including a pair of ends cut away from each other, and said cover member is integrally provided with a conductive member inserted between the pair of ends of said lead wire to electrically connect said ends to each other when said cover member is in service.

6. The malfunction preventing air bag module of claim 4, wherein said power source is a capacitor which is connected to a battery carried on a vehicle and which is incorporated in said actuating circuit.

* * * * *